United States Patent [19]

Sanday

[11] 4,072,007

[45] Feb. 7, 1978

[54] GAS TURBINE COMBUSTOR EMPLOYING PLURAL CATALYTIC STAGES

[75] Inventor: Santiago C. Sanday, Swarthmore, Pa.

[73] Assignee: Westinghouse Electric Corporation, Pittsburgh, Pa.

[21] Appl. No.: 663,338

[22] Filed: Mar. 3, 1976

[51] Int. Cl.[2] .................... F02C 7/22

[52] U.S. Cl. .................... 60/39.69 A; 23/288 R; 252/477 R

[58] Field of Search .................... 60/39.82 C, 39.69 A; 23/288 R, 288 FC; 252/477 R; 431/7

[56] References Cited

U.S. PATENT DOCUMENTS

| | | | |
|---|---|---|---|
| 2,887,456 | 5/1959 | Halford et al. | 23/288 R |
| 3,088,271 | 5/1963 | Smith | 23/288 FC |
| 3,692,497 | 9/1972 | Keith et al. | 23/288 R |
| 3,912,459 | 10/1975 | Kearsley | 252/477 R |
| 3,929,419 | 12/1975 | Chapman | 252/477 R |
| 3,943,705 | 3/1976 | De Corso et al. | 60/39.82 C |
| 3,953,176 | 4/1976 | Santala et al. | 23/288 FC |
| 3,969,083 | 7/1976 | Givens et al. | 23/288 FC |

*Primary Examiner*—Robert E. Garrett
*Attorney, Agent, or Firm*—E. C. Arenz

[57] ABSTRACT

A gas turbine combustor of the catalytic reactor type has the catalytic element means formed of a crossflow honeycomb type in which the various series of flow passages extend in oblique relation to each other and to longitudinal axis of the combustor shell so that the combustion gas from different radial locations in a cross section upstream from the catalytic element means is shifted to other radial locations in passing downstream, to promote temperature uniformity of the gas in a radial direction throughout the cross section of the combustor.

5 Claims, 3 Drawing Figures

GAS TURBINE COMBUSTOR EMPLOYING PLURAL CATALYTIC STAGES

BACKGROUND OF THE INVENTION

1. Field of the Invention

This invention pertains to the art of gas turbine combustors, particularly those of the catalytic reactor type.

2. Description of the Prior Art

The most common arrangement for combustion of air-fuel mixtures for use in gas turbines has been the conventional combination of fuel, oxygen and spark. Sometimes exhaust gas burning is also used to provide reheat for further use or to reduce for disposal of the gases. In either case, the temperature during part of the process substantially exceeds the final temperature, which is an undesirable result as it produces noxious by-products. Also, there is a condition of non-uniformity of temperature often developed through the cross section of the combustor.

One proposed way of accomplishing combustion without overheating involves bringing the air-fuel mixture in contact with a catalyst which is coated on a ceramic substrate. While the substrate may take various forms, one proposed form is that of a honeycomb which, if it has its passage axes parallel to the direction of flow does not preclude a non-uniform temperature distribution downstream of the reactor caused by a non-uniform air-fuel mixture upsteam of the reactor. An EPA report No. 650/273–014 dated August 1973 and entitled "Investigation of Surface Combustion Concepts for NOX Control in Utility Boilers and Stationary Gas Turbines" states that among the geometrically different configurations usable as catalyst supports in tail abatement systems there is included a cross flow-type structure that enhances flow turbulence and mixing.

U.S. Patent application Ser. No. 520,831 filed Nov. 4, 1974, and now abandoned, discloses one arrangement for a catalytic combustor for a gas turbine and also identifies a number of prior art U.S. patents relating to catalytic devices relating to gas turbines.

It is the aim of this invention to provide an improved catalytic combustor for a gas turbine.

SUMMARY OF THE INVENTION

In accordance with the invention the combustor is provided with catalytic element means comprising at least one cross flow honeycomb type structure having a multiplicity of catalyst flow passages with at least two series of flow passages extending in crossing relation to each other and to the longitudinal axis of the shell so that combustion gas from different radial locations in the cross section upstream from the catalytic element means is shifted to other radial locations in passing downstream to promote temperature uniformity of the gas throughout the cross section of the combustor. In the preferred form there is a succession of at least two of the catalytic element means and they are spaced apart from each other in an axial direction to provide a mixing space between the successive ones.

DRAWING DESCRIPTION

DESCRIPTION OF THE PREFERRED EMBODIMENT

Figure 1:
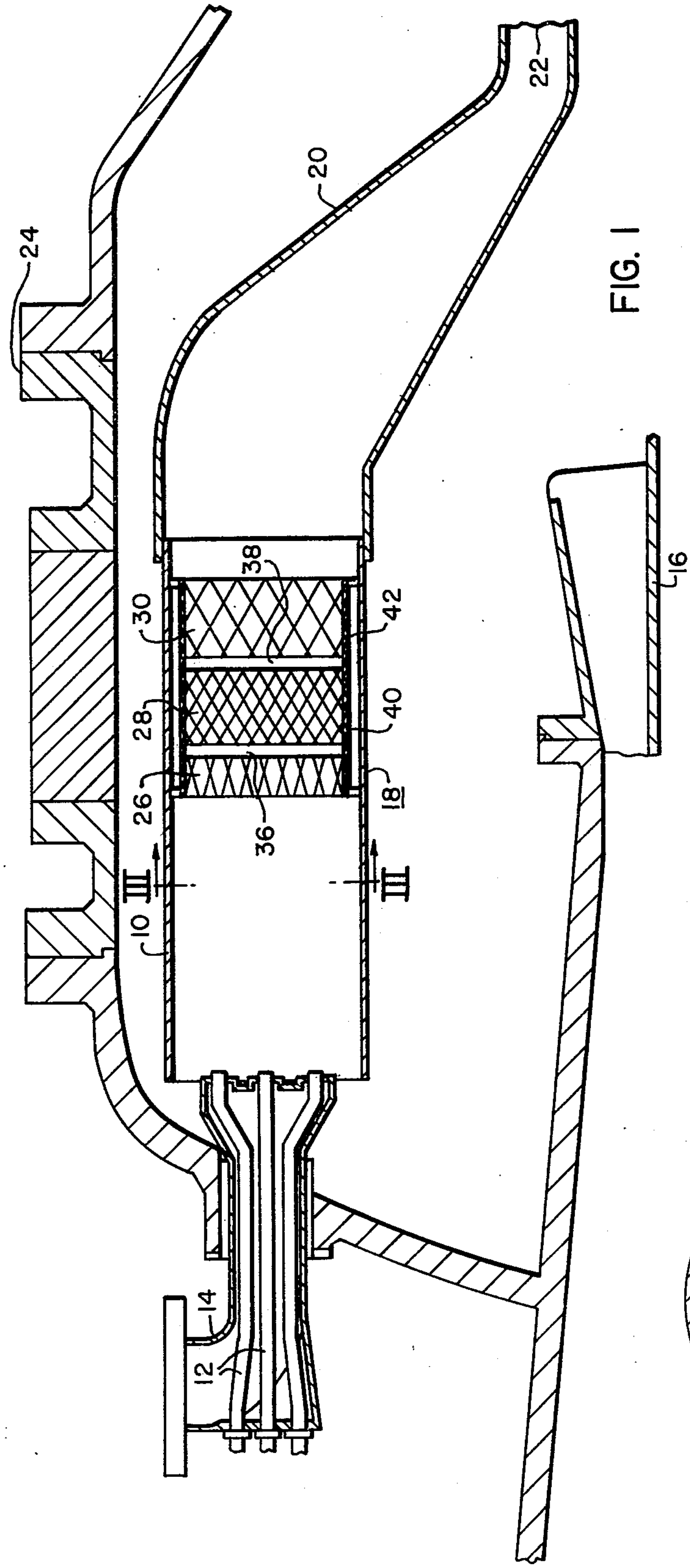
FIG. 1 is a partly-diagrammatic longitudinal cross section of a combustor according to the invention.

FIG. 1 mainly shows a single combustor arrangement for a gas turbine power plant. While the combustor 10 may have various configurations in cross section, for purposes of the description herein it has a cylindrical cross section. The fuel system may be of the dual type including oil nozzles 12 and a gasified coal nozzle arrangement 14. The particular configuration of the fuel system illustrated is the contribution of another and does not form a part of my invention. However it is noted that with such a dual fuel system the oil is used for start-up and is ignited initially by a standard ignitor. Then when the temperature of the air fed from the compressor diffuser 16 reaches the point where the reaction in the catalyst portion, generally designated 18, is sustained, the coal gas is then injected into the combustor. The way in which the combustion air is fed in part to the coal gas system, and also to the upstream end of the combustor does not form a part of this invention and accordingly is not described herein.

As is conventional the downstream end of the combustor 10 is connected to a transition section 20 which conveys the hot combustion products from the combustor 10 to an outlet 22 which connects with the turbine vanes and blades (not shown).

The elements which have been described are suitably supported within the outer shell 24 in a way to accommodate thermal expansion and contraction, such arrangements also not forming a part of the present invention.

In accordance with the invention, a series of catalytic reactor elements 26, 28 and 30 are suitably supported within the combustor 10 with at least one of the elements, and preferably all of them, being of the cross-flow honeycomb type. The ceramic cross-flow honeycomb structures which serve as the catalyst carrier are commercially available under the trademark TORVEX of the Du Pont Company.

Figure 2:
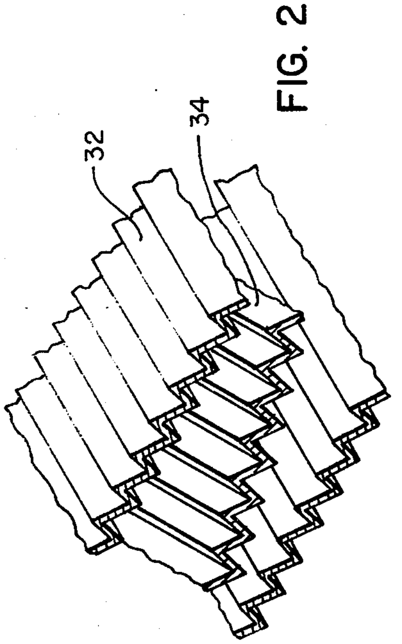
FIG. 2 is a partly-broken fragmentary face view illustrating an example of a cross flow honeycomb element.
Figure 3:
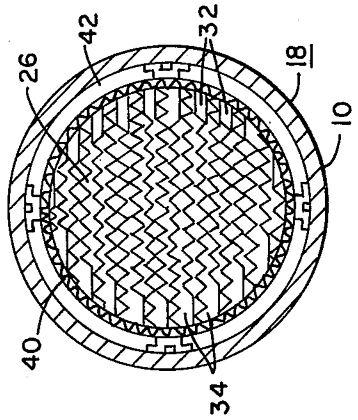
FIG. 3 is a vertical cross section corresponding to one taken along the line III-III of FIG. 1.

FIG. 2 is a representation of the general configuration of the cross-flow honeycomb substrate for the catalyst and depicts three generally corrugated layers of material with the troughs of the alternating layers 32 directed at a crossing angle from the troughs of the intermediate layer 34.

In what is believed to be the currently preferred form of carrying out the invention, the catalytic elements 26, 28 and 30 are spaced apart axially within the combustor to form mixing regions 36 and 38 between the downstream and upstream open faces of the respective elements. Also the periphery of the elements are spaced radially inwardly from the combustor shell wall 10 to provide open spaces between the perimeter of the elements and the facing wall of the shell. To this end the support means 40 for the elements may take the form of an open work structure so that the passages of the elements which open into the annular space 42 permit the exit of gas thereinto and the reentry of the gas into the open ends of farther downstream flow passages. It is also within the scope of the invention that the particular crossing angle of the various cross flow passages of the successive honeycombs differ from each other so as to further promote diffusing of hot spots, in a radial sense, beyond that would be achieved using uniform crossing angles. Also, in what is believed to be the currently preferred mode of carrying out the invention, the flow passages of successive elements will be rotated with respect to each other. In explanation thereof for example, the upstream element 26 may be oriented so that the layers of FIG. 2 are basically parallel to a horizontal plane while the layers of element 28 may be parallel to a plane 45° or so displaced in one direction from the horizontal plane, while the layers of 30 may be parallel to a plane displaced 45° or so in the other direction from the horizontal plane.

It will be appreciated that the choice of a particular crossing angle for any particular reaction element, the number of reaction elements, and the particular rotative dispositions of the reaction elements are related to the total flow, flow rate and temperature requirements for any particular combustor. Also, the ceramic honeycomb cell size and cell wall thickness may vary from upstream to downstream within a catalytic element or from element to element as required to minimize losses while maximizing diffusion and maintaining catalytic element structural integrity.

What we claim is:

1. In a gas turbine including a combustor of the catalytic reactor type having a shell containing catalytic element means intermediate the upstream part of the shell to which combustion air and fuel is admitted, and the downstream part of the shell which joins a transition section to pass combustion gas to the turbine, wherein the improvement lies in:

the catalytic element means comprising at least two cross-flow honeycomb type structures having a multiplicity of catalyst coated flow passages, one series of flow passages extending in crossing relation to another alternating series of flow passages, and both series of flow passages extending in oblique relation to the longitudinal axis of said shell, so that the combustion gas from different radial locations in a cross section upstream from said catalytic element means is shifted to other radial locations in passing downstream, to promote temperature uniformity of the gas in a radial direction throughout the cross section of the combustor, successive ones of said cross-flow catalytic element means are provided in axially-spaced relation in said shell, with the transverse cross section of the shell between said successive ones being unobstructed in the sense of accommodating axial flow throughout a cross sectional area at least equal to the cross sectional area of said catalytic element means, and being devoid of means for transferring heat out of said shell.

2. In a combustor according to claim 1 wherein:

said successive catalytic element means are spaced apart from each other in an axial direction.

3. In a combustor according to claim 1 wherein:

said catalytic element means is dimensioned and located in said shell to provide an open space between the perimeter of said element means and the facing wall of said shell, the ends of the flow passages at said perimeter being open to permit the exit of gas thereto and its reentry into the open ends of farther downstream flow passages.

4. In a combustor according to claim 1 wherein:

the angles of said flow passages, relative to the axis of said shell, in successive ones of said catalytic element means, differ from the angles in the preceding catalytic element means.

5. In a combustor according to claim 4 wherein:

the planes in which the flow passages of said successive ones of said catalytic element means lie are rotated relative to the planes of the flow passages of another of said catalytic element means.

* * * * *